UNITED STATES PATENT OFFICE.

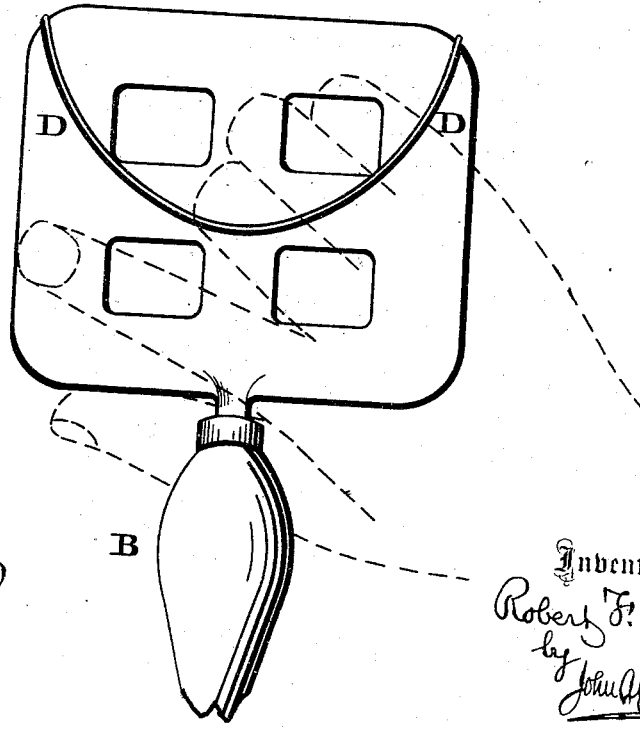

ROBERT F. WALSH, OF PHILADELPHIA, PENNSYLVANIA.

IMPROVEMENT IN CURRY-COMBS.

Specification forming part of Letters Patent No. 168,815, dated October 11, 1875; application filed May 14, 1875.

*To all whom it may concern:*

Be it known that I, ROBERT F. WALSH, of the city and county of Philadelphia and State of Pennsylvania, have invented a new and useful Improvement in Curry-Combs; and I do hereby declare the following to be a clear and exact description of the nature thereof, sufficient to enable others skilled in the art to which my invention appertains to fully understand, make, and use the same, reference being had to the accompanying drawings making part of this specification, in which—

Figure 1 is a side elevation of the device embodying my invention. Fig. 2 is a bottom of face view thereof. Fig. 3 is a top view thereof.

Similar letters of reference indicate corresponding parts in the several figures.

The objection to curry-combs now in use is the bending of the teeth, and the sharp and pointed ends thereof, the animals being thereby cut and scratched. My invention is designed to remedy these defects, and consists in arranging the angular teeth so that their scraping-faces present themselves in lines diagonal to the transverse and longitudinal directions of the comb. It also consists in a "holdback," whereby the hand may take firm hold of the comb on the back thereof.

Referring to the drawings, A represents the back of the comb and B the handle thereof. C represents a series of teeth separated one from another, and which are made of cast metal, formed with or connected to the back A, or with pieces attached to said back. These teeth are of angular form in cross-section, and present the several faces *a a a a*, one of the teeth being thus specially designated in Fig. 2. The angles of the teeth point to the transverse and longitudinal directions of the comb, so that the faces *a a* present themselves in lines diagonal to said directions. The ends of the teeth are flat or blunt, as seen at *b b*.

It will be seen that when the comb is being worked the faces *a a* of the teeth present themselves severally to the skin of the animal, so that every portion thereof will be subjected to the scraping action of the broad sides or faces of the teeth, and none escape said action, whereby the currying of the animal will be performed expeditiously and surely, and without danger of cutting or scratching, since no dangerous edges are presented. Moreover, the teeth are not liable to bend or break, and when they become dull or irregular they may be readily ground again true and serviceable. The teeth setting free one from another are prevented from holding the hair and dirt, and thus will not clog and occupy time to be cleansed thereof.

Secured to the front of the back A is a holdback, D, which consists of a loop which extends towards the handle of the comb. The loop will be grasped by the second, third, and fourth fingers, the forefinger bearing against the back of the comb and the thumb pressed against the rear of the back adjacent to the handle and under the shank or tang *d* thereof, whereby the comb may be firmly grasped, and conveniently operated without the handle proper, as is often preferred, or at times necessary.

Having thus described my invention, what I claim as new, and desire to secure by Letters Patent, is—

1. The curry-comb provided with teeth, each tooth having a series of scraping-faces, *a a*, substantially as and for the purpose set forth.

2. The teeth C, having their scraping-faces *a* extend diagonally to the transverse and longitudinal directions of the comb, substantially as and for the purpose set forth.

3. The combination, with the curry-comb, of a holdback, consisting of the loop D attached to the front end thereof, substantially as and for the purpose set forth.

ROBT F. WALSH.

Witnesses:
JOHN A. WIEDERSHEIM,
NEWTON HARTMAN.